Feb. 22, 1949. J. V. BARNES 2,462,154
WATER SOFTENER
Filed Dec. 10, 1946 2 Sheets-Sheet 2
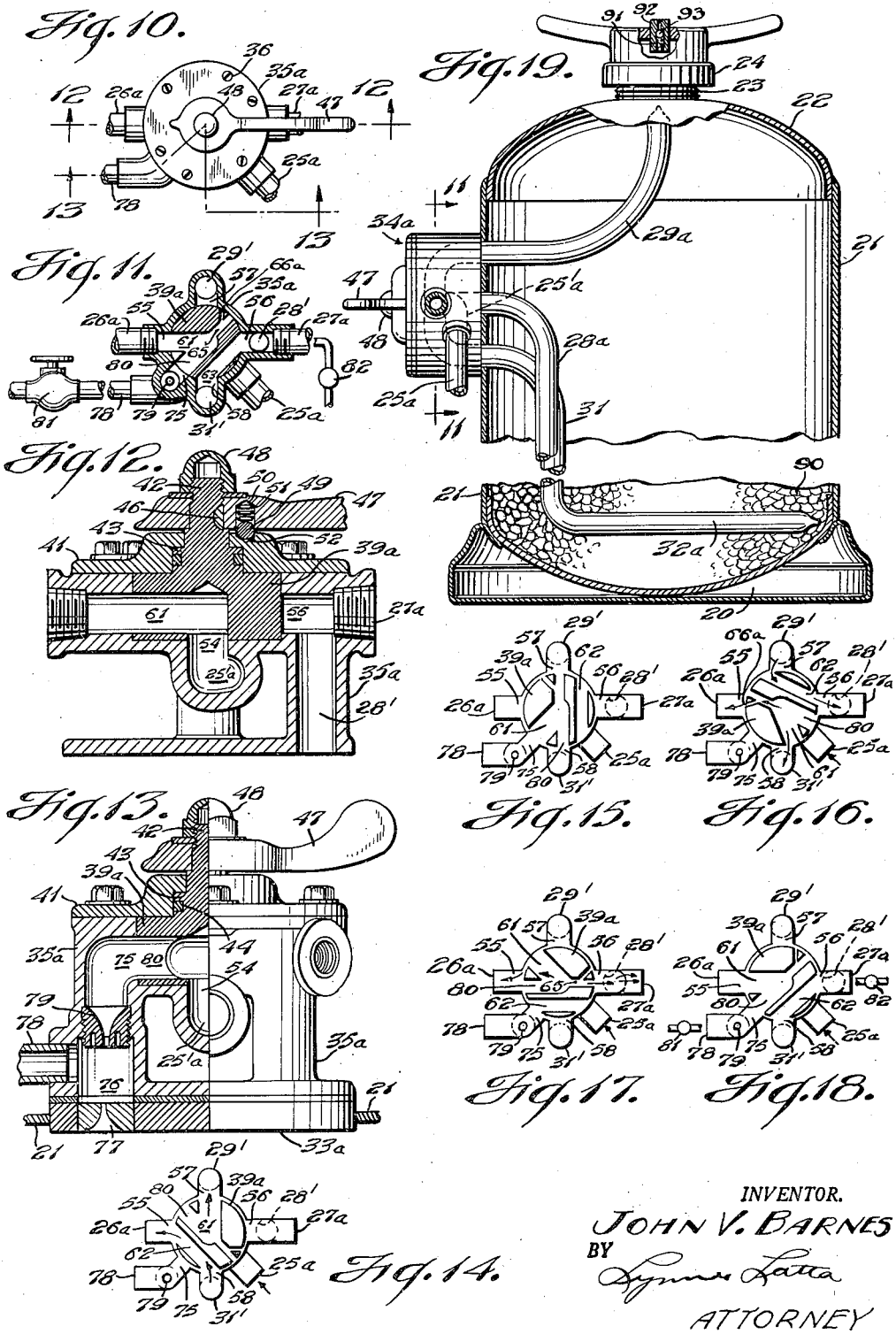
INVENTOR.
JOHN V. BARNES
BY
ATTORNEY Patented Feb. 22, 1949

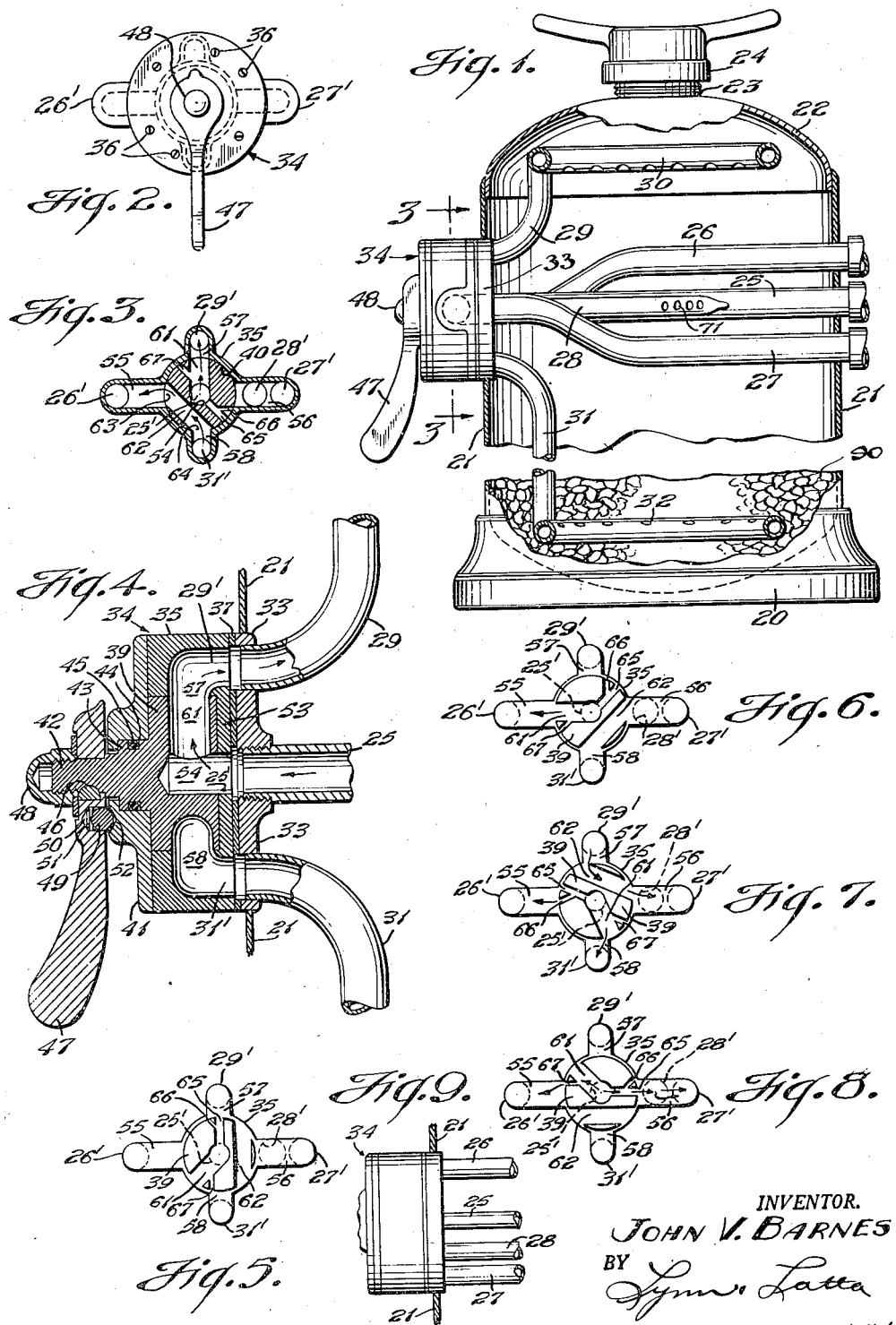

2,462,154

UNITED STATES PATENT OFFICE 2,462,154

WATER SOFTENER

John V. Barnes, La Canada, Calif.

Application December 10, 1946, Serial No. 715,150

8 Claims. (Cl. 210—24)

This invention relates to water softeners. The general object of the invention is to provide a water softener in which all operations, including normal house service, back wash, shut off, etc., are controlled by a single, multiple position valve. In one form of the invention, which I will refer to as the "manual" type, the valve also controls a siphoning operation for emptying the softener preparatory to inserting regenerating salt by hand, and in the other form of the invention, which I will refer to as the "automatic," the valve controls both siphoning and regenerating operations, the regeneration in this case being carried out by piping a salt solution into the softener from an adjacent tank.

I am aware that others have proposed water softeners having multiple control valves. However, these prior devices have certain shortcomings which the present invention eliminates. As far as I am aware, in all such softeners, it is necessary, during the back wash, regeneration, siphon, bypass, etc. stages, to forego the use of house faucets serviced by the softener, in order to prevent the salt solution used in regeneration from entering the water pipes leading to the faucets.

One of the objects of my invention is to provide a water softener having a single multiple control valve, which provides for bypassing water from the main around the softener and to the faucet lines. In one aspect of the invention, provision is made for a full bypass of a normal flow of water around the softener, with the softener isolated from the water system (e. g. for purposes of repair, etc.). In another aspect of the invention, provision is made for a partial flow of bypass water around the softener during the regenerating, back wash, etc. phases. This partial flow is handled by the same valve that controls the various phases of softener operation. This eliminates additional piping required in plumbing installations to and from other softeners.

Another object of the invention is to provide a water softener having valve control means for siphoning from the softener tank the liquid contents preparatory to the regenerating phase to make a positive means other than gravity for removing water on top of the tank prior to placing salt in the tank, in the case of the manual type softener (type when salt is placed in by hand). In the case of the automatic softener, this setting prior to "Regeneration setting" enables a greater concentration of brine solution to be brought from the brine tank at a greater rate of flow by virtue of the fact that the brine solution is exited into a tank under atmospheric pressure.

More particularly, it is my object to provide a water softener which utilizes the force of the water flow through the water circulating system to set up a suction in a siphoning outlet capable of withdrawing the liquid contents from the softener tank. Another object is to provide a water softener having such a siphoning mechanism which is controlled from the same valve that controls all other phases of the softener operation.

A further object of the invention is to provide a water softener having a multiple control valve that is extremely easy to operate and that has means for accurately determining and latching the control valve in each of its positions.

A further object of the invention is to provide a water softener, which, when installed in a building, has an exterior which is completely free from piping except at the extreme back of the softener where it may be situated against a wall or in a corner. More particularly, it is my object to provide a softener having a single control valve disposed at the front of the softener and connected to multiple piping, all of which is concealed, eliminating any external bypass valves and piping.

Another object of the invention is to provide a water softener that is particularly adapted to production manufacturing methods. To this end, I provide a softener in which all tubing is embodied in a manifold unit including a face plate which serves as a mounting base for the valve per se. It is thus possible to assemble the tubing to the face plate in an assembly jig, prior to installation in the softener tank, to then assemble this manifold unit in the tank, weld the face plate to the shell or head of the softener, and then to attach the valve to the face plate. This also provides for easy removal of the valve for servicing either the valve or the tubes. For example, if one of the tubes should become obstructed, it may be possible to dislodge the obstruction by removing the valve and attaching an air pressure line for blowing out the tube.

Other objects of the invention will become apparent in the ensuing specifications and appended drawings, in which:

Fig. 1 is a side view of a water softener embodying one form of my invention, with a majority of one side of the shell removed to disclose the interior construction thereof;

Fig. 2 is a front view of the valve of Fig. 1;

Fig. 3 is a sectional view of the valve, taken on line 3—3 of Fig. 1, shown in the normal house service position;

Fig. 4 is a vertical sectional view of the valve;

Fig. 5 is a schematic view of the valve shown in the shut off position;

Fig. 6 is a schematic view of the valve shown in the bypass position;

Fig. 7 is a schematic view of the valve shown in the back wash position;

Fig. 8 is a schematic view of the valve shown in the siphon position;

Fig. 9 is an elevation view of the valve mounted to tank, shown partly in section;

Fig. 10 is a front view of the valve of a modified form of the invention, with the automatic salting feature;

Fig. 11 is a transverse horizontal sectional view of the valve of Fig. 10, taken on the line 10—10 of Fig. 19, and showing the valve in the salting position;

Fig. 12 is a vertical transverse sectional view of the valve of Fig. 10, taken on the line 12—12 of Fig. 10;

Fig. 13 is an inverted plan view, partly in section, of the valve of Fig. 10, taken on the line 13—13 of Fig. 10;

Fig. 14 is a schematic view of the valve of Fig. 10 shown in the normal flow position;

Fig. 15 is a schematic view of the valve of Fig. 10, shown in the shut off position;

Fig. 16 is a schematic view of the valve of Fig. 10, shown in the back wash position;

Fig. 17 is a schematic view of the valve of Fig. 10, shown in the siphoning position;

Fig. 18 is a schematic view of the valve of Fig. 10, shown in the bypass position; and Fig. 19 is a side view of a modified water softener embodying the valve of Fig. 10, with the majority of the softener shell shown in section to illustrate the internal construction.

I will now describe in detail the:

MANUAL TYPE

As an example of one form in which the invention may be embodied, I have shown in Figs. 1 to 9 inclusive a water softener which is of what I term a "manual" type. This softener includes a conventional base 20, a generally cylindrical shell 21 welded thereto and projecting upwardly, and a head 22 welded to the shell 21 and having a threaded inlet neck 23 normally closed by a screw cap 24. These parts define the tank which is adapted to contain a conventional bed of base exchange mineral (e. g. "zeolite") for softening the water.

The manifold assembly of tubing includes a water supply inlet tube 25, a house service tube 26, a drain tube 27, a siphon tube 28, a tube 29 the upper end of which constitutes a top spray bar 30, and a suction line which comprises a tube 31 formed at its lower end into a bottom spray bar 32 disposed in the lower region of the softener tank. Each of the tubes 25, 26, 27, 28, 29, and 31 are securely mounted at one end in an opening in a face plate 33 to form the manifold unit.

In assembling the manifold unit in the shell 21, the tubes 25, 26, and 27 are passed through openings in the rear side of the shell 21, the face plate 33 is then inserted into an opening in the forward side of the shell 21 and welded to the shell and the tubes are welded or brazed to the shell.

The advantages of bringing the connections through the back of the valve are several. The main advantage resides in the fact that the tubes 25, 26, and 27, connecting the softener to the house plumbing system, extend out through the back of the softener tank and directly into plumbing connections that are concealed behind the softener. This advantage is particularly heightened when the plumbing connections are in a wall against which the softener is installed. In such an arrangement, the softener presents a neat surface that is devoid of plumbing and is entirely smooth except for the valve 34 and cap 24. Such an installation can be much more readily kept clean and sanitary than one having pipes and valves obstructing its outer surface.

My improved valve, which is designated generally at 34 in Fig. 1, comprises the face plate 33, a valve casing 35 secured to the face plate 33 by screws 36 (Fig. 2) with a gasket 37 interposed between the face plate and the casing 35, a cylindrical valve core 39 rotatably mounted in a cylindrical valve chamber 40 in the casing 35, and a cap 41 which is secured to the forward face of the casing 35 by the screws 36.

Projecting from the forward face of the valve core 39 through an opening in the cap 41, is a stub shaft 42. An enlarged portion of the stub shaft 42, journaled in a counterbore 43 in the cap 41, has an annular groove 44 which receives an O-ring packing 45. The packing ring 45 seals the opening in the cap 41. Keyed at 46 to the stub shaft 42 is an operating handle 47 which is secured by a nut 48 threaded onto the end of the stub shaft 42. A poppet ball 49, received in a cylindrical recess 50 in the handle 47, is urged by a spring 51 into engagement with a selected one of a series of recesses 52 in the cap 41 and functions to yieldingly latch the valve element in a selected operative position.

Referring now to Figs. 3 and 4, the valve case 35 has a series of ports 25', 26', 27', 28', 29' and 31' communicating respectively with the openings in the face plate 33 in which the tubes 25, 26, 27, 28, 29, and 31, respectively, are secured. The port 25' enters the valve case 35 at the axis of the valve core 39 and through the rear wall 53 of the valve case. The port 25' communicates with an axial passage 54 entering the valve core 39 through the rear face thereof. The ports 26', 27', 29' and 31' communicate with the valve chamber 40 through radial passages 55, 56, 57, and 58, respectively, defined within corresponding tubular arms of the valve case 35. The port 28' communicates with the radial passage 56 between the port 27' and the cylinder 40, whereby the flow of water under pressure past the port 28' to the port 27' may create suction in the siphon tube 28, as will be more fully described hereinafter.

The rotatable valve core 39 is provided with a radial passage 61 extending from the axial passage 54 to its periphery and adapted to connect the water supply inlet 25 selectively to the upper spray bar through the port 29' (Fig. 3) or to the house service outlet 26' (Fig. 6) or to the bottom spray bar outlet port 31' (Fig. 7). The valve core 39 has a chordal transfer passage 62, the ends of which open into the periphery of the valve element 39 to define ports 63 and 64 that are disposed approximately 90 degrees apart, with the port 64 approximately 180 degrees from the outer end of the radial passage 61 and the port 63 approximately 90 degrees therefrom. In order to best achieve this arrangement, the passage 62 extends approximately at an angle of 45 degrees with reference to the passage 61, and its midportion is approximately centered between the periphery of the valve core 39 and the central passage 54.

The rotatable valve element 39 has a radial vena-contracta orifice. It also has a pair of bleed ports 66 and 67, each opening into the periphery of the valve element 39, the former branching from the radial passage 65 and the latter branching from the radial passage 61.

OPERATION OF MANUAL TYPE

In the operation of my improved water softener shown in Figs. 1 to 9 inclusive, the valve 34 may be utilized to control all of the following operations, except the salting operation:

Normal service

Adjustment of the valve to the position shown in Figs. 1 to 4 inclusive places the radial passage 61 of the rotatable valve element 39 in communication with casing passage 57 and the ports 63 and 64 of the chordal passage 62 of the rotatable valve core in communication with casing passages 55 and 58 respectively, the passage 56 being cut off.

City (hard) water enters the valve 34 from the water supply inlet tube 25 through the port 25' in the rear wall 53 of the valve case 35, thence through central passage 54 and radial passage 61 in the rotatable valve core 39 (Figs. 3 and 4), thence through peripheral passage 57 and port 29' in the valve case 35, thence through tube 29 and top spray bar 30 from which it is sprayed upon the mineral bed and passes through the bed, retaining gravel 90, bottom spray bar 32, tube 31, port 31' and peripheral passage 58 in the valve case 35, thence through chordal passage 62 to radial passage 55 and port 26' in the valve case 35, and thence through port 26' and house service tube 26 to the piping leading to the house service outlets (faucets, etc.).

Bypass

By adjusting the valve 34 to the position shown schematically in Fig. 6, the radial passage 61 of the rotatable valve element 39 is placed in communication with the house service outlet passage 55 and ports 26', while all communication between the water supply inlet 25' and the other radial passages 56, 57, 58 of the valve casing, is cut off. Thus, although the chordal transfer passage 62 is in communication with drain outlet port 27' and lower spray bar port 31', there is no resulting circulation through the softener or to the drain, hence inlet pressure is cut off from both the spray bars and the drain. This makes it possible, in the event that the softener commences to function improperly, to isolate the softener from the water system and establish direct (hard water) service to the house service outlet to meet temporary needs pending the commencement of regeneration or repair operations on the softener, and the change over is effected by the simple operation of shifting the valve 34 to the Fig. 6 position. The direct house service which is thus provided is a full flow contrasted to the partial flow to house service that is provided in the backwash and regenerating operations which will now be described.

Backwash

By adjusting the valve 34 to the position shown schematically in Fig. 7, the rotatable valve element passage 61 is placed in partial communication with casing passage 58 and lower spray bar 31', the bleed passage 66 is placed in communication with house service outlet port 26', and the ports 63 and 64 of the transfer passage 62 are placed in partial communication respectively with the upper spray bar port 29' and the passage 56 and drain outlet port 27'. The partial opening is made to provide a limited rate of water flow to keep the mineral bed from being washed out of the softener.

With these connections established, the flow from the supply inlet 25' is divided between the lower spray bar 32 and the house service line 26, the majority of the flow being directed to the lower spray bar 32. The flow through the softener will be a reverse flow from the lower spray bar 32 upwardly through the mineral bed, to the upper spray bar 30 back to the valve, and thence through the transfer port 62 to the drain outlet. Thus, there is provided the backwash flow which is utilized for washing impurities from the upper layers of the mineral bed into the drain and freeing the interstices of the mineral bed for a full flow of water therethrough when normal house service is resumed.

Regeneration

Two steps are required for regeneration, namely, (1) siphoning and (2) salting. My invention provides for automatic siphoning off of the contents of the softener tank, above the mineral bed, by simply shifting the valve 34 to the position shown schematically in Fig. 8. In this position, the vena-contracta orifice 65 of the rotatable valve core 39 is placed in communication with casing passage 56 and drain outlet port 27', and the bleed passage 67 is placed in communication with the house service outlet passage 55 and ports 26', while communication to both of the spray bars is cut off. Consequently, the flow from the water supply inlet port 25' is divided between the house service outlet 26' and the drain outlet 27', the majority of the flow being directed to the drain outlet port 27'.

The cap 24 of the softener tank is either removed or loosened so as to establish atmospheric pressure in the tank. The vena-contracta orifice 65 directs a high speed jet of water to the drain outlet port 27' past the siphon port 28', setting up an aspirating suction in the siphon tube 28 which functions to withdraw the liquid from the softener tank through the orifices 71 in the tube 28, until the level of the liquid has been drawn down to that of the orifices.

In the salting operation, salt is inserted by hand into the tank through the neck 23 and is dissolved in the water remaining in the tank, providing the brine mixture which is utilized in regenerating the mineral bed.

AUTOMATIC TYPE

In the form of the invention shown in Figs. 10 to 19 inclusive, features that are similar to those of Figs. 1 to 9 inclusive are indicated by corresponding reference characters. Features that are similar with the exception of slight modifications therein, are indicated by corresponding reference characters with the suffix "*a*." For example, the water supply inlet tube 25*a* instead of entering the valve through the shell 21, is shown directly entering through the periphery of the valve casing 35*a* and connecting with a radial passage 25'*a* which makes a right angled bend to become the axial passage 54.

The drain outlet tube 27*a* and the house service outlet tube 26*a* are likewise shown entering the valve casing through the periphery thereof. It is to be understood, however, that this showing is merely illustrative of the fact that it is possible to bring these connections in through the periphery of the valve rather than through the back of the valve, although the advantages of bringing the connections through the back of the valve may be incorporated in this modified form of the invention the same as in the previously described form.

I provide, in addition to the mechanism and functions of the previously described form, an automatic salting mechanism which includes an elbow passage 75 in the valve case, communicating through a chamber 76 with a salting port 77 in the face plate 33a. A salt line 78, leading from a brine tank, enters the periphery of the valve casing 35a, and communicates with the chamber 76 adjacent the port 77. In the passage 75, between the chamber 76 and the passage 75, is a nozzle 79 which is adapted to direct a high velocity stream of water through the port 77 and to create in the salt line 78 an aspirating suction which draws the brine solution into the chamber 76.

There is provided, in the rotatable valve core, a radial passage 80 which is adapted to register with the passage 75 as shown in Figs. 11 and 13. In the salt line 78 is a globe valve 81 and in the drain line 27a is a similar valve 82.

OPERATION OF AUTOMATIC TYPE

The construction of the fully automatic form of the invention will be understood from the foregoing comparison to the manual form, and from the following description of operation:

*Normal flow*

Referring first to Fig. 14, the adjustment of the valve 34a to the normal flow position brings the rotatable valve element passage 61 into communication with the casing passage 57 and house service outlet port 29' and places the transfer passage 62 in communication with the casing passages 58 and 55 respectively. Water enters the valve through supply line 25a, and passages 25'a and 54, and leaves through passages 61 and 57 and port 29' to upper spray bar 29a. From the spray bar 29a it is sprayed into the tank, and passes through the mineral bed and gravel 90, to the lower spray bar 32a. From the lower spray bar, the softened water passes upwardly through the tube 31 to the port 31' and then passes through the valves in passages 58, 62 and 55 to the house service line 26a.

*Shutoff*

Fig. 15 shows the shutoff position of the valve 34a, in which both the house service and the drain outlets 55 and 56 are cut off so that no water can leave the softener.

*Backwash*

Adjustment of the valve 34a to the backwash position shown in Fig. 16 places the radial port 61 of the rotatable valve element in partial communication with casing passage 58 and lower spray bar outlet port 31', and places transfer passage 62 in partial communication with casing passages 57 and 56 so as to connect upper spray bar port 29' to drain outlet line 27a. Bleed port 66a communicates with house service outlet 26a to provide partial flow thereto.

Backwash flow enters the valve from city water supply tube 25a, passes from passage 61 to lower spray bar port 31' and thence through tube 31 and lower spray bar 32a into the bottom of the tank. The water then passes upwardly through the mineral bed, washing out any impurities therein, enters the upper spray bar 29a, passes into the valve through port 29', and passes through the valve in passages 57, 62, and 56 to drain outlet tube 27a.

The partial communication between passage 61 and 58 restricts the flow in a manner to prevent turbulence of water entering the tank, thus avoiding loss of mineral through the spray bars.

*Regenerating*

Regenerating includes the two steps of siphoning the contents from the tank and piping a salt solution into the tank.

Siphoning is effected by shfting the valve 34a to the position shown in Fig. 17, in which the radial passage 80 of the rotatable valve core is placed in communication with the house service outlet passage 55 and vena-contracta orifice 65 is placed in communication with the casing passage 56.

Siphoning flow is from city water inlet tube 25a through central passage 54 and a high velocity jet issues through orifice 65 to drain tube 27a past port 28' which is connected to siphon tubes 28a extending down to just above the mineral bed. The high velocity jet creates an aspirating suction in the port 28' which draws the fluid from the tank through the siphon line 28a and passes it into the drain tube 27a. The vacuum set up in the tank is sufficient to offset the tension of spring 91 of relief valve 92 whereupon ball 93 that seals under pressure falls and allows atmospheric pressure to enter the tank, allowing the water to be siphoned out.

The siphon tube 28a extends to a point fairly near the bottom of the tank so that a sufficient volume of water is siphoned from the tank to permit the insertion of a maximum quantity of brine during the salting step.

Salting is effected by shifting the valve to the position shown in Fig. 11, after the siphoning step has been completed. In this position of the valve, radial passage 61 is placed in communication with casing passage 55 and passage 80 is in communication with nozzle 79.

The globe valves 81 and 82 are in their opened positions.

Salting flow is from supply inlet 25a to port 54, from which the flow divides and goes through passages 61 and 55 to tube 26a for house service, and through radial passage 80 and elbow passage 75 to nozzle 79 through which a high velocity stream of city water is injected into chamber 76 and through opening vena contracta orifice 77 in face plate 33. The aspirating action of this high velocity stream creates a suction in the salt line 78 and draws the salt solution from the solution reservoir through the open valve 81 into the chamber 76, where it mingles with the stream of water ejected from the nozzle 79 and passes into the softener tank through the salt port 77.

Should the salting operation be permitted to proceed beyond the point where the the brine rises in the tank to the level of the drain tube 27a, the excess brine will pass through the bottom spray bar and tube 31, port 31', passages 58, 62 and 56, to the drain tube 27a through which it will be discharged to the drain through the open valve 82.

Bypass

Adjustment of the valve 34a to the bypass position shown in Fig. 18 places the rotatable valve element 39a in the same position as it occupies in the salting step just described. However, the globe valve 82 in the drain tube 27a is closed in order to prevent any circulation of water or salt solution through the softener, and valve 81 in the salt line is closed at the completion of salting. Consequently, although passage 80 is in communication with passage 75 and diagonal passage 62 is in communication with passages 58 and 56, there will be no flow through these connections, and the only flow will be from the supply inlet tube 25a to port 54 and passage 61 to passage 55 and house service tube 26a.

I claim:

1. In a water softener, the combination with a tank for holding a softening agent, a control valve including a casing having a rear wall exposed within the tank, upper and lower spray bars within the tank, each having a connection to the valve through said rear wall, house service, drain and water inlet tubes extending transversely through the tank from front to rear thereof and having connections with the valve through said rear wall, and a valve core in said valve casing adjustable to a normal service position providing for normal flow through the tank and to house service connection, and a backwash position providing for reverse flow through the tank and to the drain outlet tube.

2. In a water softener, the combination with a tank for holding a softening agent, a valve connected to the forward side of the shell of said tank, upper and lower spray bars in the tank having connections with the rear of said valve, house service, water inlet and drain tubes passing transversely through the tank from the rear to the front thereof and having connections with the rear side of the valve, said valve being adjustable to a position providing for normal flow through the tank and to the house service tube and a backwash position providing reverse flow through the tank and to the drain outlet.

3. In a water softener, in combination with a tank for holding a softener agent, a valve including a casing attached to the forward side of the shell of said tank, upper and lower spray in the tank, connected to the rear side of said casing, house service, water inlet, and drain tubes passing transversely through the tank from the rear to the front thereof and having connections with the rear side of said casing, and siphon tube in the tank connected to the rear side of said casing; and a valve core in said casing adjustable to a position in which it provides for normal flow from the water inlet to the upper spray bar and from the lower spray bar to the house service connection, a backwash position in which it provides for reverse flow from the water inlet to the lower spray bar and from the upper spray bar to the drain outlet, and a siphoning position in which it provides for flow from the inlet to the drain, said valve casing including an operating connection between the drain connection and the siphon tube connection, such as to establish a suction in the siphon tube as the result of direct flow from the inlet to the drain.

4. A valve for a water softener including a tank for containing a softening agent and having a siphon outlet connection, said valve including a valve casing having a city water inlet, connections to house service and drain outlet lines and a connection between said drain outlet line and said siphon outlet connection, said valve including a rotatable valve element having a vena-contracta orifice adapted in one position of said valve to deliver a jet of water from said city water inlet past said siphon connection to said drain outlet connection, and to thereby produce an aspirating action establishing suction in said siphon outlet connection for withdrawing liquid from the tank, said valve adapted in another position to establish normal flow through the softener.

5. In a water softener, a tank for containing a softening agent, upper and lower spray bars and a siphon outlet in said tank, and a control valve embodying a casing having a city water inlet, connections to said upper and lower spray bars, to said siphon outlet and to house service and drain outlet lines respectively, said valve including a rotatable valve element having a vena-contracta orifice adapted, in one position of said valve, to deliver a jet of water from said city water inlet to said drain outlet, said siphon outlet having a connection with said drain outlet such as to establish suction in said siphon outlet by an aspirating action as a result of the flow of said jet, and said valve element adapted in another position to establish normal flow through the softener.

6. In a water softener, a tank for containing a softening agent, upper and lower spray bars and a siphon outlet therein, and a control valve including a valve casing having connections to said spray bars and siphon outlet, and having city water inlet and house service and drain outlet connections, said valve including a rotating valve element having a vena-contracta orifice adapted in one position of the valve to deliver a jet of water from the city water inlet to the drain outlet and said siphon outlet having a connection with said drain outlet whereby said jet will produce an aspirating action for establishing suction in said siphon outlet for withdrawing liquid from the tank, said valve in another position connecting said city water inlet to the upper spray bar and said lower spray bar to the house service outlet for normal house service operation, and in another position connecting said city water inlet to the lower spray bar and the lower spray bar to the drain outlet for backwash operation.

7. In a water softener, a tank for containing a softening agent, upper and lower spray bars and a siphon outlet in said tank, and a control valve embodying a casing having connections to said upper and lower spray bars, to said siphon outlet and to house service and drain outlet lines respectively, said valve including a rotatable valve element having an orifice adapted, in one position of said valve, to deliver a jet of water from said city water inlet to said drain outlet, said siphon outlet having a connection with said drain outlet such as to establish suction in said siphon outlet by an aspirating action as a result of the flow of said jet, said valve element adapted in another position to establish normal flow through the softener, and in another position establishing a direct bypass from the city water inlet to the house service outlet and shutting off the connections to the water softener so as to isolate the softener from the water circulation system.

8. A valve for a water softener having a tank for containing a softening agent, and having a siphon outlet, said valve including a casing having a city water inlet, house service and drain outlets, a connection between said siphon outlet and said drain outlet, and flow connections to the tank; the valve including a valve core having an orifice for delivering to said drain outlet from the city water inlet a jet adapted to establish suction in said siphon outlet for withdrawing liquid from the tank, said valve core including a main city water passage to one of the flow connections to the tank and to connect the other flow connection to the house service outlet for normal softener operation, and in another position to connect said orifice to the drain for siphoning operation and to connect said bleed passage to the house service connection for establishing a limited bypass for delivering city water to the house service outlet.

JOHN V. BARNES.

REFERENCES CITED

The following references are of record in the file of this patent:

UNITED STATES PATENTS

| Number | Name | Date |
|---|---|---|
| 1,620,717 | Brice | Mar. 15, 1927 |
| 1,695,541 | Eisenhauer | Dec. 18, 1928 |
| 1,784,892 | Duden | Dec. 16, 1930 |
| 2,061,714 | Pick | Nov. 24, 1936 |
| 2,137,406 | Johnson | Nov. 22, 1938 |
| 2,265,225 | Clark | Dec. 9, 1941 |